United States Patent [19]

Versteeg et al.

[11] 4,376,876
[45] Mar. 15, 1983

[54] DC SUPPLY FOR AN ELECTRONIC SIGNALLING DEVICE

[75] Inventors: Gijsbert W. Versteeg, Hilversum, Netherlands; Ian Phillips, Sherston near Malmesbury, England; Eilev Enggrav, Oslo, Norway

[73] Assignee: U.S. Philips Corporation, New York, N.Y.

[21] Appl. No.: 187,114

[22] Filed: Sep. 15, 1980

[30] Foreign Application Priority Data

Sep. 17, 1979 [GB] United Kingdom ................. 7932109

[51] Int. Cl.³ .......................................... H04M 19/00
[52] U.S. Cl. .................................. 179/77; 179/1 HF; 179/81 B
[58] Field of Search ............... 179/70, 77, 81 R, 81 B, 179/1 HF, 16 F; 323/223

[56] References Cited

U.S. PATENT DOCUMENTS

| | | | |
|---|---|---|---|
| 3,800,095 | 3/1974 | Cowpland | 179/81 B |
| 4,079,211 | 3/1978 | Janssen | 179/81 R |
| 4,192,975 | 3/1980 | Brockman | 179/70 |
| 4,254,305 | 3/1981 | Treiber | 179/70 |
| 4,268,723 | 5/1981 | Taylor | 179/81 R |

*Primary Examiner*—Gerald L. Brigance
*Attorney, Agent, or Firm*—Laurence A. Wright

[57] ABSTRACT

A DC supply for an electronic signalling device that is connected to a signal transmission line. The device comprises a plurality of circuit units each of which must be supplied with a DC-supply current. Feeding the circuit units in series has the advantage that the DC-supply current in each of the circuit units can be utilized to the full. A drawback is that the different supply voltages add up. A practical requirement may be that the total supply voltage does not exceed a certain value at a certain value of the supply current. In order to satisfy this requirement means are present which cause the supply voltage of one of the circuit units to decrease more than proportionally to the DC-supply current when the DC-supply current decreases to below a certain value.

The invention is suitable for use in loud-speaking telephone sets.

2 Claims, 2 Drawing Figures

4,376,876

DC SUPPLY FOR AN ELECTRONIC SIGNALLING DEVICE

The invention relates to D.C. supply for an electronic signalling device that is connected to a signal transmission line. The signalling device comprises a plurality of circuit units, each having a pair of supply terminals for receiving the DC-supply current.

BACKGROUND OF THE INVENTION

A device of this type is, for example, a loudspeaking telephone set which comprises a different circuit units, such as a speech-controlled switch, a power amplifier and an electronic hybrid circuit.

For their proper operation these circuit units require a certain operating supply voltage. In order to utilize the DC-supply current in the best possible manner for the power amplifier, it is desirable to feed the power amplifier in series with the other circuit units. The operating supply voltages of the circuit units then add up, entailing the risk that a certain maximum, which is still just permissible, is exceeded.

In many automatic telephony systems it is a requirement that the voltage between the connecting terminals of the telephone set in "worst-case" circumstances, at a certain value of the DC-supply current shall not exceed a certain value.

The last-mentioned certain value may be smaller than the sum of the operating supply voltages of the circuit units, so that the said requirement is not satisfied in "worst-case" circumstances.

SUMMARY OF THE INVENTION

It is an object of the invention to provide an electronic signalling device of the type mentioned in the opening paragraph, by means of which, in "worst-case" circumstances, the requirement that the voltage between the connecting terminals of the device shall not exceed a certain value at a certain value of the DC-supply current, can be satisfied. The electronic signalling device according to the invention is characterized in that the supply terminals of at least two circuit units are connected such that the supply current flows in series through the circuit units and the supply voltage of one circuit unit is added to the supply voltage of the other circuit unit and that means are present which causes the supply voltage of at least one of the circuit units to decrease more than proportionally to the DC-supply current at a decrease of the DC-supply current to below a certain value.

BRIEF DESCRIPTION OF THE DRAWINGS

The invention and its advantages will now be further described with reference to the drawing wherein:

FIG. 1 shows the block diagram of a loudspeaking telephone set which is a typical example of an electronic signalling device of the present type.

DETAILED DESCRIPTION OF THE PREFERRED EMBODIMENTS

The invention will be further explained with reference to the loudspeaking telephone set, on the understanding that the invention is applicable to other electronic signalling devices comprising a plurality of circuit units which are fed by means of the signal trammsmission line.

Figure 1:
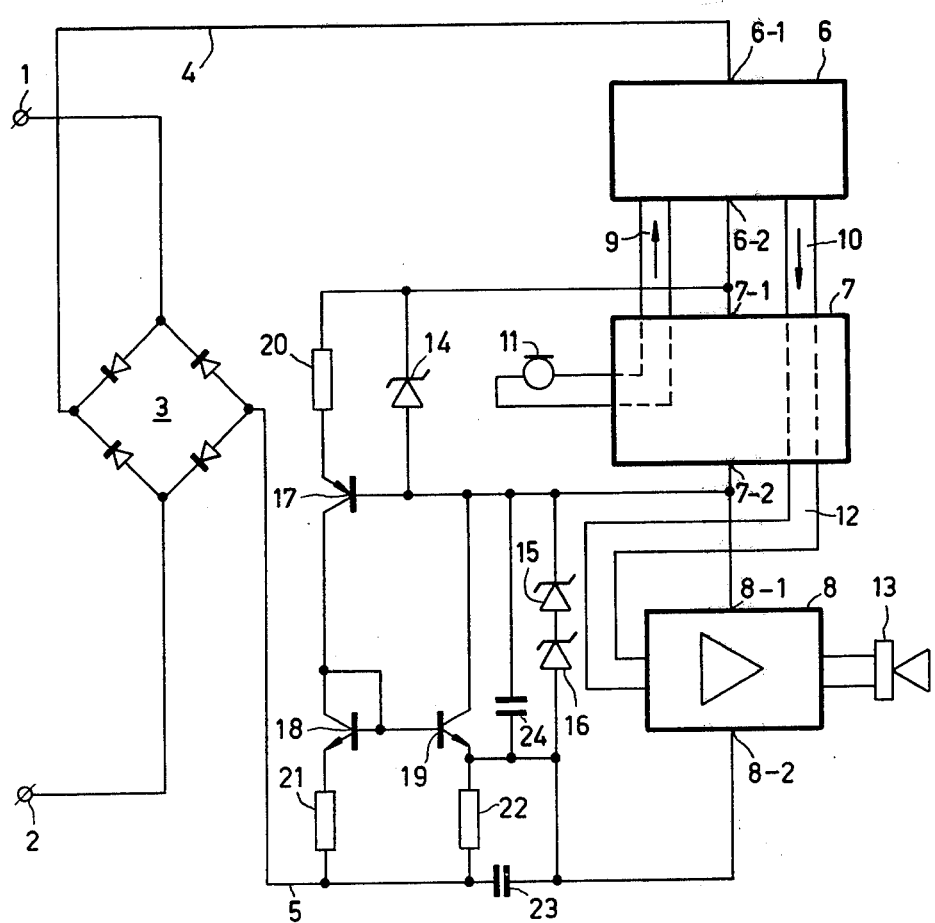
FIG. 1 is a block diagram of a device according to the invention.

The loudspeaking telephone set shown in FIG. 1 comprises a pair of terminals 1 and 2 for connecting the set to a signal transmission line, for example a subscriber's line of an automatic telephony system. The telephone set is adapted so that it can receive a DC-supply voltage which is applied to the set by means of the signal transmission line. In the event that the signal transmission line is a subscriber's line of a telephone exchange, this DC-supply voltage comes from the central battery of the telephone exchange. Usually, the subscriber's line is then connected to the central battery by means of a pair of resistors, which are denoted as supply resistors.

To make the telephone set independent of the polarity of the DC-supply voltage of the signal transmission line a rectifier bridge circuit 3 is arranged between the connecting terminals 1 and 2 and the further circuits of the set. This rectifier bridge ensures that the voltage of conductor 4 will always be positive relative to the voltage of conductor 5. The conductors 4 and 5 carry the supply current of the telephone set circuits, this current flowing from conductor 4 to conductor 5 and, simultaneously, the conductors 4 and 5 carry the other signal currents which are caused by speech and/or signalling signals.

It should be understood that the block diagram of FIG. 1 shows only some important circuit units of a loudspeaking telephone set. Still further circuit units can be added to these units for performing still further functions. However, the invention can be explained by means of the shown circuit units.

It should further be understood that the invention does not concern itself with the exact construction of the circuit units from which a loudspeaking telephone set is constructed. The invention relates to the DC-supply of the circuit units. Depicting the circuit units by means of a block diagram will therefore be sufficient to explain the invention.

The loudspeaking telephone set shown in FIG. 1 comprises an active hybrid 6, a duplex switch 7 and a power amplifier 8.

The hybrid 6 comprises a pair of supply terminals 6-1 and 6-2. The duplex switch 7 comprises a pair of supply terminals 7-1 and 7-2. The power amplifier 8 comprises the supply terminals 8-1 and 8-2. The supply terminals are interconnected so that the supply current flows in series through the circuit units and the supply voltages of the circuit units add up.

Loudspeaking telephone sets are known per se, for example from the U.S. Pat. No. 3,751,602 and the U.S. Pat. No. 4,052,562.

In addition, the hybrid 6 comprises a connection for a transmit path 9 and a connection for a receive path 10. Speech signals are applied to hybrid 6 by means of transmit path 9. In response to these speech signals, signal currents flow between the terminals 6-1 and 6-1, causing a signal current to flow between the connecting terminals 1 and 2. Speech signals originating from the signal transmission line cause signal currents to flow between the supply terminals 6-1 and 6-2. Speech signals appear on the receive path 10 in response to these signal currents.

The construction of hybrid 6 is of no importance for the understanding and application of the invention. It suffices to know that hybrid 6 may comprise active elements in the form of operational amplifiers and transistors, which, for their proper operation, require a DC-supply current derived from the supply terminals 6-1 and 6-2. FIG. 3b of the above-mentioned U.S. Pat. No. 3,751,602 shows a possible embodiment of hybrid 6, on the understanding that the supply terminal 6-2 would be connected to the collector of the transistor shown therein and the supply terminal 6-1 would be connected to the emitter of the same transistor via the resistor shown in that Figure.

The duplex switch 7 provides a transmission path between the microphone 11 and the transmit path 9 or between the receive path 10 and the loudspeaker channel 12. The duplex switch 7 comprises circuits, which, depending on the signals derived from microphone 11 and receive path 10, effect a transmission path into one direction, from microphone 11 to transmit path 9, or into the other direction, from receive path 10 to loudspeaker 12.

The construction of duplex switch 7 is irrelevant for the understanding and use of the invention. In principle, any known duplex xwitch may be used. FIG. 11 of the above- mentioned U.S. Pat. No. 4,052,562 shows a particularly suitable embodiment, on the understanding that one of the loudspeakers shown therein and the associated power amplifier would be replaced by transmit path 9 and the microphone associated with the loudspeaker would be replaced by receive path 10; the remaining power amplifier with the loudspeaker connected thereto would correspond to power amplifier 8 and loudspeaker 13, and the microphone associated with the loudspeaker would correspond to microphone 11.

The electronic circuits in the duplex switch 7 require a DC-supply current for their proper operation, this supply current being derived from the supply terminals 7-1 and 7-2. The supply voltage between the supply terminals 7-1 and 7-2 is stabilized by means of the Zener diode 14, which is arranged in parallel with the supply terminals. The AC-impedance of Zener diode 14 is very low, so that the AC signal currents flowing between the supply terminals 6-1 and 6-2 of the hybrid 6 will flow through the Zener diode.

The power amplifier 8 amplifies the speech signals which are applied to the amplifer by means of the loudspeaker channel 12. The DC-supply current is derived from the supply terminals 8-1 and 8-2. The supply voltage between these terminals is stabilized by the series arrangement of the Zener diodes 15 and 16, which is arranged in parallel with the supply terminals. These Zener diodes form a bypass for the AC-signal currents, in the same manner as Zener diode 14.

An important reason for arranging the supply paths of the switching unit 6, 7 and 8 in series is that in this way the DC-supply current of the telephone set can be fully utilized for power amplifier 8. A drawback is that the supply voltages of the circuit units add up.

In a practical automatic telephone system the DC-voltage between the terminals 1 and 2 of the telephone set shall not exceed a certain value, at a certain value of the DC-supply current. For example, the said voltage shall not be higher than approximately 18.5 Volts at 15 mA, assuming there is a telephone exchange having a central battery voltage of not less than 42 Volts, a pair of supply resistors having a combined resistance of not more than 1000Ω, a line length of not more than 2 km and a threshold value of 15 mA for the line current.

The above-mentioned values which may act in combination in the worst-case circumstance result in a maximum permissible terminal voltage at the above-mentioned threshold value of the line current. Using this voltage value as reference value, also in the event that the DC-supply current exceeds the threshold value, results in a limitation of the supply voltages of the circuit units. Designing the circuit units then becomes more difficult or their performances become less satisfactory, the latter applying in particular to the power amplifier 8.

Figure 2:
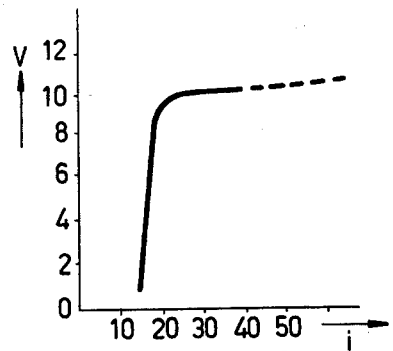
FIG. 2 is a voltage-current diagram to illustrate the operation of the device according to the invention.

According to the invention, a circuit is provided which senses the DC-supply current and which causes the supply voltage of the power amplifier 8 to decrease more than proportionally to the supply current when the supply current approaches the threshold value. FIG. 2 shows the variation of the supply voltage V of power amplifier 8 as a function of the supply current i of the telephone set. The threshold value is, for example, 15 mA; then the supply voltage amounts to, for example, 4.5 Volts, while the supply voltage amounts to, for example, 10 Volts for supply currents of a higher value.

The supply voltages of the active hybrid 6 and the duplex switch may, for example, have a combined value of approximately 12.5 Volts which, together with the supply voltage of, for example, 10 Volts of power amplifier 8 and the voltage drop across rectifier bridge 3 produces a voltage of approximately 25 Volts between the connecting terminals 1 and 2. The decrease in the supply voltage of the power amplifier 8 from 10 Volts for currents over 15 mA to 4.5 Volts at the 15 mA threshold value ensures that the terminal voltage does not become greater than the maximum permissible value of approximately 18.5 Volts at the threshold value. The fact that the quality of the reproduction of the speech by the loudspeaker in the worst-case circumstance, which seldom occurs, is not so good is accepted for the sake of a qualitatively good loudspeaker reproduction in normal circumstances.

The current sensing circuit comprises inter alia the transistors 17, 18 and 19. A current of approximately 1 mA which is adjusted by means of resistor 20, flows through transistor 17. This current also flows in series through the transistor 18 which is connected as a diode, and the resistor 21 of approximately 300Ω. The voltage across transistor 18 and resistor 21 in series then is approximately 900 mV.

The supply current of the telephone set flows through resistor 22 having a value of approximately 18Ω, which is shunted by capacitor 23 for AC-signal currents. The said 900 mV voltage is present across the series arrangement of the base-emitter junction of transistor 19 and resistor 22. The transistor 19 becomes conductive when the supply current falls to below approximately 16.5 mA. In that event the capacitor 24, which normally constitutes a buffer for feeding power amplifier 8, is discharged by transistor 19. The current which is ultimately applied by transistor 19 to resistor 22 is such that the sum of the voltages the base-emitter junction of transistor 19 and resistor 22 balances the said 900 mV voltage.

The action of the current sensing circuit has for its result that, at a decrease of the DC-supply current flowing between the connecting terminals 1 and 2 (the line current) the supply voltage of the power amplifier 8 decreases to such an extent that when the threshold value of the line current is reached the maximum permissible terminal voltage is not exceeded. The power amplifer may then be rated for a supply voltage which is greater than the supply voltage which is permissible in the worst-case circumstances for a line current of 15 mA.

What is claimed is:

1. An electronic signalling device which may be used with a loudspeaker telephone set and which is connected to a signal transmission line over which a DC-supply current is applied to the device, said signalling device comprising:

a plurality of circuit units each comprising a pair of supply terminals for receiving DC supply current the supply terminals of at least two of said circuit units being connected such that said supply current flows in series through the circuit units and the supply voltage of one circuit unit adds to the supply voltage of at least one other of said circuit units, and switching means for causing a substantial portion of said DC supply current to bypass at least one of said circuit units when said DC supply current decreases to below a threshold value.

2. An electronic signal device as claimed in claim 1, wherein said switching means comprises:

a transistor and wherein the main current path of said transistor is connected in parallel with said supply terminals of said at least one of said circuit units, and means for controlling said transistor by the application to said transistor of the voltage difference between a reference voltage and a voltage which is proportional to said DC-supply current.

* * * * *